United States Patent
Miyazawa (10) Patent No.: US 10,694,108 B2
(45) Date of Patent: Jun. 23, 2020

(54) IMAGING APPARATUS AND METHOD OF CONTROLLING THEREOF

(71) Applicant: CANON KABUSHIKI KAISHA, Tokyo (JP)

(72) Inventor: Hitoshi Miyazawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/151,640

(22) Filed: Oct. 4, 2018

(65) Prior Publication Data
US 2019/0124266 A1   Apr. 25, 2019

(30) Foreign Application Priority Data

Oct. 23, 2017   (JP) ................. 2017-204682

(51) Int. Cl.
*H04N 5/232* (2006.01)
*H04N 5/238* (2006.01)
*H04N 5/235* (2006.01)

(52) U.S. Cl.
CPC ......... *H04N 5/23287* (2013.01); *H04N 5/238* (2013.01); *H04N 5/2329* (2013.01); *H04N 5/2353* (2013.01); *H04N 5/23209* (2013.01); *H04N 5/23222* (2013.01); *H04N 5/23254* (2013.01); *H04N 5/23258* (2013.01); *H04N 5/23261* (2013.01)

(58) Field of Classification Search
CPC ........... H04N 5/23287; H04N 5/23209; H04N 5/23261; H04N 5/23254; H04N 5/2353; H04N 5/23258; H04N 5/23222; H04N 5/238; H04N 5/2329
See application file for complete search history.

(56) References Cited

U.S. PATENT DOCUMENTS

2015/0288876 A1* 10/2015 Furuya ................. H04N 5/2353
                                                              348/169
2015/0304564 A1* 10/2015 Noguchi ............ H04N 5/23258
                                                              348/208.11

(Continued)

FOREIGN PATENT DOCUMENTS

JP   2015-198439 A   11/2015

OTHER PUBLICATIONS

JP 2015-198439 A, US 2015/0288876 A1.

*Primary Examiner* — Jason A Flohre
(74) *Attorney, Agent, or Firm* — Venable LLP (57) ABSTRACT

An imaging apparatus includes an angular velocity sensor that detects a shake and a motion vector detection unit that detects a motion of a subject, and optically corrects an image blur by moving a shift lens. In a mode for supporting panning imaging, a shutter speed calculation unit calculates first and second exposure times as an exposure time of an imaging element. The first exposure time is calculated using a shake detection signal, a motion amount of a subject image, a focal distance of an imaging optical system, and a set value of a flow effect of a background image. The second exposure time is calculated from the shake detection signal, the motion amount of the subject image, a position and a maximum correction angle of a shift lens. If the first exposure time exceeds the second exposure time, processing of preferentially determining the second exposure time is performed.

10 Claims, 8 Drawing Sheets

(56) References Cited

U.S. PATENT DOCUMENTS

| | | | |
|---|---|---|---|
| 2015/0373282 A1* | 12/2015 | Ishii | H04N 5/2354 348/239 |
| 2016/0091729 A1* | 3/2016 | Ollila | H04N 5/23287 348/208.99 |
| 2018/0027163 A1* | 1/2018 | Uchida | H04N 5/2353 348/361 |
| 2018/0063436 A1 | 3/2018 | Miyazawa | |
| 2018/0063439 A1 | 3/2018 | Miyazawa | |

\* cited by examiner

IMAGING APPARATUS AND METHOD OF CONTROLLING THEREOF

BACKGROUND OF THE INVENTION

Field of the Invention

The present invention relates to a technique for correcting an image blur of a subject.

Description of the Related Art

Panning imaging is a method in which a shutter speed is set so that a constant shake amount (hereinafter, referred to as a background flow amount) is obtained for an imaging element and photographing is performed while causing a camera to follow a motion of the subject in order to express a dynamic feeling for a subject.

A first reason why panning imaging is generally a difficult photographing technique is that it is difficult to photograph while causing the camera to follow the motion of the subject so that a deviation of a photographing direction does not occur with respect to the motion of the subject. In a case where a deviation occurs in the photographing direction with respect to the motion of the subject, the deviation appears in a photographed image as a subject shake. A second reason is that a person who is not familiar with panning imaging does not know an optimum set value of the shutter speed. For example, a first photographing scene in which panning imaging of a train that moves at a speed of 60 km/h is performed and a second photographing scene in which panning imaging of a racing car that moves at a speed of 250 km/h is performed are assumed. Since the shutter speeds at a time at which the background flow amounts of the first photographing scene and the second photographing scene are the same are different, it is not easy for a photographer without experience and skill to succeed in panning imaging.

Therefore, a function (hereinafter, referred to as a panning imaging assist function) for allowing even a beginner to easily perform panning imaging has been proposed. A first panning imaging assist function (hereinafter, referred to as a first assist function) is a function of detecting a deviation of a photographing direction of a camera with respect to a motion of a main subject and correcting a subject shake according to the deviation by a correction optical system. Japanese Patent Laid-Open No. 2015-198439 discloses an imaging apparatus that calculates an exposure time on the basis of a maximum correction angle of a correction optical system.

According to the related art, in photographing in which an image blur correction function by the correction optical system is effective, in a case where a shake correction amount is equal to or greater than a predetermined value, there is a possibility that there may be an image in which a subject shake will occur.

SUMMARY OF THE INVENTION

The present invention determines an exposure time for suppressing an occurrence of a subject shake in an imaging apparatus having a function of optically correcting an image blur.

An imaging apparatus for optically correcting an image blur by a correction unit for an image of a subject that is imaged by an imaging unit through an imaging optical system, according to the present invention is provided that includes: at least one processor and at least one memory functioning as: an acquisition unit configured to acquire information related to a difference between a current correction angle and a maximum correction angle of the correction unit; a first calculation unit configured to calculate a first exposure time related to the imaging unit; a second calculation unit configured to calculate a second exposure time related to the imaging unit based on a shake detection signal detected by a first detection unit, a motion amount of a subject image detected by a second detection unit, and the information related to the difference between the current correction angle and the maximum correction angle of the correction unit; and a determination unit configured to determine an exposure time when imaging is performed by the imaging unit, wherein, in a case where the first exposure time exceeds the second exposure time, the determination unit determines the exposure time when imaging as the second exposure time.

According to the imaging apparatus of the present invention, it is possible to determine an exposure time for suppressing an occurrence of a subject shake in an imaging apparatus having a function of optically correcting an image blur.

Further features of the present invention will become apparent from the following description of exemplary embodiments (with reference to the attached drawings).

DESCRIPTION OF THE EMBODIMENTS

Hereinafter, an exemplary embodiment of the present invention will be described with reference to the drawings. Before describing the present exemplary embodiment, the reason why it is not always preferable to always set an exposure time based on a maximum correction angle of a correction optical system will be described with a specific example.

First Embodiment

First, it is assumed that the exposure time based on the maximum correction angle of the correction optical system at a time of panning imaging is calculated by Formula (1).

$$TV = \theta \max/(\omega s - \omega g) \quad (1)$$

Here,
TV: exposure time [sec],
θmax: maximum correction angle of correction optical system [degrees],
ωs: subject angular velocity [degrees/sec]
ωg: camera angular velocity [degrees/sec]

Since a shake correction by the correction optical system is also performed before an exposure, it is necessary to use a correction angle obtained by subtracting a current correction angle from the maximum correction angle. For example, in a case where it is assumed that the maximum correction angle θmax of the correction optical system is 0.5 [degrees] and the correction angle of 0.2 [degrees] is able to be used in the shake correction before the exposure, the correction angle that is able to be used during the exposure is 0.3 [degrees]. At each correction angle, the exposure time calculated in a photographing scene in which a subject angular velocity is 40 [degrees/sec] and a camera angular velocity is 20 [degrees/sec] is as shown in Formulas (2) and (3).

$$Ss=0.5/(40-20)=1/40 \text{ [sec]} \quad (2)$$

$$Ss=0.3/(40-20)=1/66 \text{ [sec]} \quad (3)$$

In the case where a shake correction operation is performed before the exposure, the exposure time becomes shorter than that of the case where a calculation is performed using the maximum correction angle.

On the other hand, a panning imaging assist function for automatically setting a shutter speed according to the photographing scene is referred to as a second assist function in the following. In the second assist function, the exposure time is adjusted so that a background flow amount is a constant background flow amount on an imaging surface according to the focal distance, the subject angular velocity, the camera angular velocity, and a background flow effect for selecting a degree of a background flow amount. Therefore, there may be the case where the flow effect of the background is reduced according to an amount of change of the exposure time due to a change from the calculated exposure time to a short second side.

Figure 1:
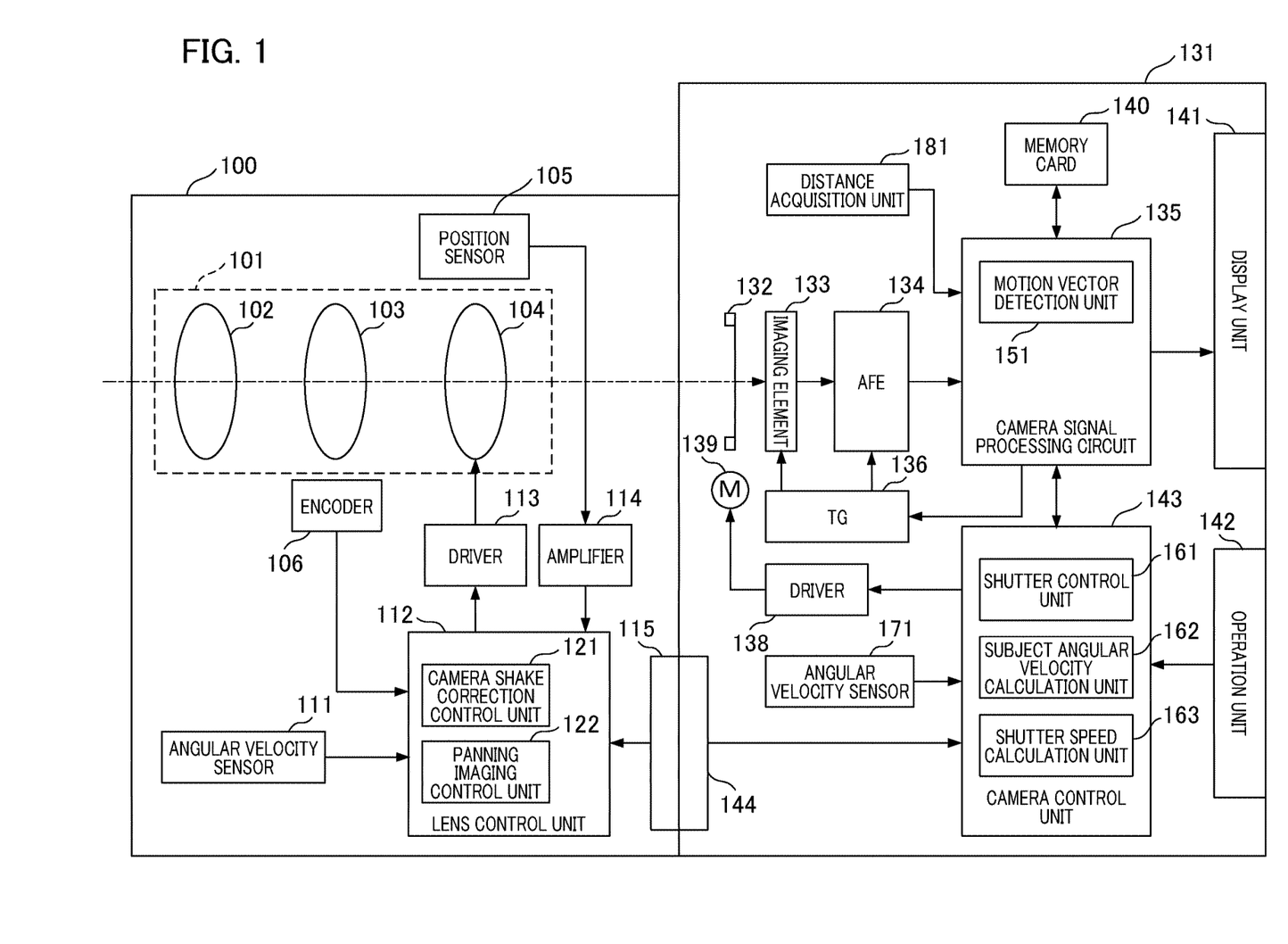
FIG. 1 is a diagram illustrating a configuration of an imaging apparatus according to the present exemplary embodiment.

In the present exemplary embodiment, an imaging apparatus and a method of controlling the imaging apparatus capable of setting a suitable exposure time in consideration of a relationship between the subject shake, a hand shake, and the exposure time will be described in detail. FIG. 1 is a diagram illustrating a configuration example of an imaging apparatus according to the present exemplary embodiment. As an example of an imaging system in which an interchangeable lens 100 is able to be attached to a camera main body portion 131, a digital camera having a panning imaging assist function for supporting panning imaging will be described. A control mode in the case where setting of the panning imaging assist is performed is referred to as a "panning imaging assist mode". The imaging apparatus has first and second assist functions in the panning imaging assist mode.

The interchangeable lens 100 includes a photographing lens unit 101. The photographing lens unit 101 includes a main imaging optical system 102, a zoom lens group 103, and a shift lens group 104. The main imaging optical system 102 includes a fixed lens group, a focus lens, or the like. The zoom lens group 103 is an optical member capable of changing a focal distance. The shift lens group (hereinafter, also simply referred to as a shift lens) 104 is a movable lens for an image blur correction. The shift lens group 104 functions as a correction lens that corrects the image blur by changing an image forming position of light from the subject. It is possible to optically correct an image shake with respect to an optical axis due to a shake of the imaging apparatus by moving the shift lens in a direction perpendicular to the optical axis of the photographing lens unit 101.

The interchangeable lens 100 includes a zoom encoder 106, a position sensor 105, and an angular velocity sensor 111. The zoom encoder 106 detects a position of the zoom lens group 103. The position sensor 105 detects a position of the shift lens group 104. The angular velocity sensor 111 is an example of shake detection unit for detecting the shake of the imaging apparatus and outputs a shake detection signal.

A lens control unit 112 includes a microcomputer for lens system control. The lens control unit 112 performs driving control of the shift lens group 104 through a driver 113. An amplifier 114 amplifies an output of the position sensor 105 and outputs a position detection signal of the shift lens to the lens control unit 112.

The interchangeable lens 100 has a mount contact unit 115 and is connected to a mount contact unit 144 of the camera main body portion 131. The lens control unit 112 includes first and second control units. The first control unit is a camera shake correction control unit 121 that performs camera shake correction control. The second control unit is a panning imaging control unit 122 that performs control for the panning imaging assist. In addition to these, the lens control unit 112 performs focus adjustment control by a movement of the focus lens, aperture control, or the like, but the focus adjustment control by the movement of the focus lens, the aperture control, or the like is omitted for simplicity of the drawings. In addition, in the camera shake correction by the camera shake correction control unit 121, for example, the shake detection and the correction are performed with respect to two orthogonal axes such as a horizontal direction and a vertical direction. However, since the configurations with respect to the two axes are the same, the configuration with respect to only one axis will be described. As described above, the imaging apparatus of the present exemplary embodiment includes the image blur correction device that optically performs the image blur correction by moving the optical element (the shift lens) in the direction perpendicular to the optical axis.

The camera main body portion 131 includes a shutter 132 for controlling the exposure time. The imaging element 133 is, for example, a complementary metal oxide semiconductor (CMOS) type image sensor or the like, receives light from the subject of which the image is formed through the imaging optical system, and outputs an electrical signal by a photoelectric conversion. An analog signal processing circuit (AFE) 134 processes an output signal of the imaging element 133 and provides the output signal of the imaging element 133 to the camera signal processing circuit 135.

The camera signal processing circuit 135 includes a motion vector detection unit 151. The motion vector detection unit 151 detects a motion of the subject from a plurality of images of which imaging times are different on the basis of the output signal of the imaging element 133. In addition, the camera signal processing circuit 135 processes the output signal of the imaging element 133, outputs a recording signal to a memory card 140, and outputs a display signal to a display unit 141. A timing generator (TG) 136 sets an operation timing of the imaging element 133 or the analog signal processing circuit 134. An operation unit 142 includes a power switch, a release switch, a changeover switch, and the like. The user is able to set the panning imaging assist mode by operating the changeover switch.

A camera control unit 143 includes a microcomputer for camera system control and controls each of components of the imaging system. The camera control unit 143 includes a shutter control unit 161, a subject angular velocity calculation unit 162, and a shutter speed calculation unit 163. The shutter control unit 161 controls a shutter driving motor 139 through a driver 138 and controls an operation of the shutter 132. The subject angular velocity calculation unit 162 calculates an angular velocity of a main subject. The shutter speed calculation unit 163 calculates the shutter speed when the panning imaging assist mode is set.

The memory card 140 is a recording medium for recording a signal of a photographed image. The display unit 141 includes a display device such as a liquid crystal panel (LCD). The display unit 141 performs a monitoring display of the image of the subject to be photographed by the user with the camera and displays the photographed image on a screen.

The camera main body portion 131 includes the mount contact unit 144 with the interchangeable lens 100. The lens control unit 112 and the camera control unit 143 perform serial communication at a predetermined timing through the mount contact units 115 and 144. An angular velocity sensor 171 detects a shake of the camera main body portion 131 and outputs a shake detection signal to the camera control unit 143. A distance acquisition unit 181 acquires distance information related to the captured image and outputs the distance information to the camera signal processing circuit 135.

In the imaging system of FIG. 1, in the case where the user operates the power switch of the operation unit 142 and the power of the camera is turned on, the camera control unit 143 detects a state change thereof. The camera control unit 143 supplies power to each circuit of the camera main body portion 131 and performs an initial setting. In addition, the power is supplied to the interchangeable lens 100 and the lens control unit 112 performs an initial setting in the interchangeable lens 100. After the camera control unit 143 and the lens control unit 112 are in a state in which the camera control unit 143 and the lens control unit 112 are able to perform the communication, the communication is started between the camera control unit 143 and the lens control unit 112 at a predetermined timing. In the communication from the camera control unit 143 to the lens control unit 112, a state of the camera, photographing setting information, and the like are transmitted. In addition, in the communication from the lens control unit 112 to the camera control unit 143, focal distance information, angular velocity information, and the like of the interchangeable lens 100 are transmitted.

The user is able to change from a normal mode to the panning imaging assist mode by operating the changeover switch of the operation unit 142. In the case where the normal mode in which the panning imaging assist mode is not set is selected, in the interchangeable lens 100, the angular velocity sensor 111 detects the shake applied to the camera due to a camera shake or the like. The camera shake correction control unit 121 performs the driving control of the shift lens group 104 using a detection signal from the angular velocity sensor 111. Therefore, the camera shake correction operation is performed and the image blur of the captured image is reduced.

Figure 2:
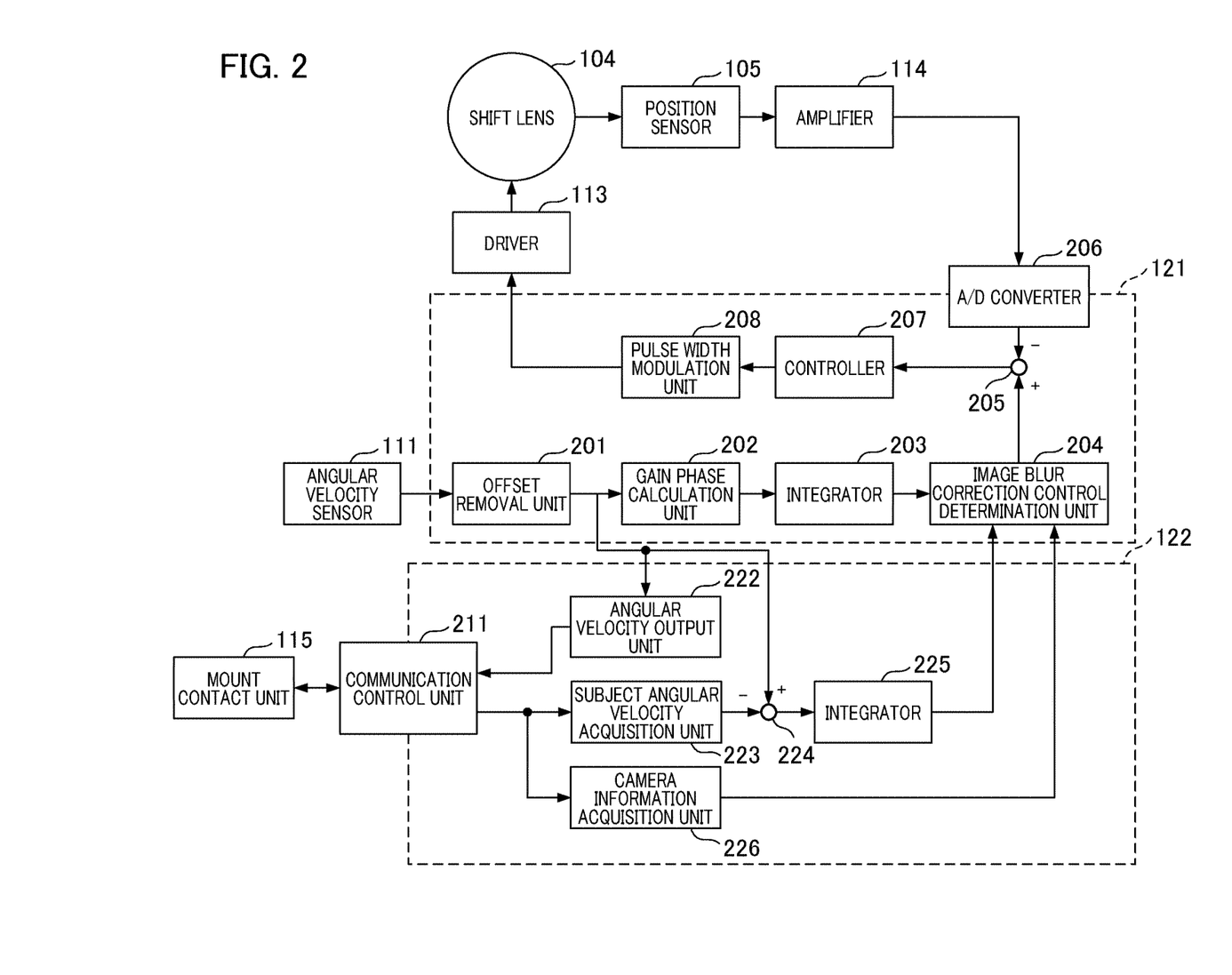
FIG. 2 is a control block diagram of a correction optical system according to the present exemplary embodiment.

The camera shake correction function will be described with reference to FIG. 2. FIG. 2 is a configuration diagram related to the camera shake correction operation and the panning imaging assist operation. Components the same as those of FIG. 1 are denoted by the same reference numerals already used, and descriptions thereof will be omitted.

The camera shake correction control unit 121 includes an offset removal unit 201 and removes an offset included in the angular velocity detection signal by the angular velocity sensor 111. For example, the offset removal unit 201 removes a direct current component included in an output of the angular velocity sensor 111 using a filter calculation unit configured of a high pass filter (HPF) or the like. A gain phase calculation unit 202 acquires an output of the offset removal unit 201 and performs amplification and phase compensation. The gain phase calculation unit 202 is configured of an amplifier that amplifies an angular velocity signal from which the offset component is removed with a predetermined gain, and a phase compensation filter. An integrator 203 integrates an output of the gain phase calculation unit 202. The integrator 203 has a function capable of changing characteristics thereof in an arbitrary frequency band and calculates a driving amount of the shift lens group 104.

The camera shake correction control unit 121 performs processing of determining panning (or tilting) of the imaging apparatus. For example, in the case where the angular velocity indicated by the detection signal of the angular velocity sensor 111 has a magnitude that is equal to or greater than a predetermined threshold value and a predetermined time (a threshold value time for the determination) has elapsed, it is determined that the panning operation is being performed. In this case, processing of gradually changing the cutoff frequency of the HPF in the offset removal unit 201 to a higher frequency side is performed. The shift lens is controlled to be returned to an optical center position by gradually changing the cutoff frequency to the higher frequency side and gradually decreasing a target signal for the camera shake correction control. In the case where this control is not performed, the camera shake correction is performed by an angular velocity detection signal of a shake that is large enough to be determined as a panning operation. As a result, the shift lens reaches a correction limit point (a limit position of a control range) and there is a possibility that an unnatural image angle change may be seen by the photographer on the image surface. An occurrence of such a phenomenon is able to be prevented by performing processing of gradually changing the cutoff frequency of the HPF to the high frequency side.

An image blur correction control determination unit (hereinafter, referred to as a control determination unit) 204 acquires each output of the integrator 203 and an integrator 225 that will be described later, and switches a signal for driving the shift lens according to an output of a camera information acquisition unit 226 as follows.

(1) In the Case where a Photographing Mode is Set to the Panning Imaging Assist Mode The control determination unit 204 selects the output of the integrator 225 calculated by the panning imaging control unit 122.

(2) In the Case where the Photographing Mode is Set to a Mode Other than the Panning Imaging Assist Mode The control determination unit 204 selects the output of the integrator 203 calculated by the camera shake correction control unit 121.

Note that the integrator 225 and the camera information acquisition unit 226 in the panning imaging control unit 122 will be described later.

The position sensor 105 detects the position of the shift lens group 104 and a position detection signal is amplified by the amplifier 114. An analog/digital (A/D) converter 206 digitizes the position detection signal amplified by the amplifier 114 and outputs the digitized position detection signal to a subtractor 205. The subtractor 205 performs a subtraction by receiving an output of the control determination unit 204 as a positive input and an output of the A/D converter 206 as a negative input and outputs deviation data that is a subtraction result to a controller 207. The controller 207 includes an amplifier that amplifies the deviation data output from the subtractor 205 with a predetermined gain and a phase compensation filter. After the deviation data is processed by the amplifier and the phase compensation filter in the controller 207, the deviation data is output to a pulse width modulation unit 208. The pulse width modulation unit 208 acquires output data of the controller 207, modulates the output data of the controller 207 into a PWM waveform that changes a duty ratio of a pulse wave, and outputs the PWM waveform to a driver 113 for driving the shift lens. A voice coil type motor is used in driving the shift lens group 104, and the driver 113 moves the shift lens group 104 in a direction perpendicular to the optical axis of the imaging optical system according to the output of the pulse width modulation unit 208.

Next, the first assist function in the panning imaging assist mode will be described with reference to FIGS. 1 and 2. In the case where the user performs an operation to set the panning imaging assist mode by the operation unit 142, the camera control unit 143 switches to the control of the panning imaging assist. In addition, information indicating the switching is transmitted from the camera control unit 143 to the lens control unit 112, and the lens control unit 112 switches to the control of the panning imaging assist. The camera information acquisition unit 226 (FIG. 2) of the panning imaging control unit 122 acquires various kinds of the camera information transmitted from the camera control unit 143 through a communication control unit 211. The camera information is setting information, release information, or the like of the panning imaging assist mode. The camera information acquisition unit 226 outputs information necessary for the determination processing to the control determination unit 204.

An angular velocity output unit 222 acquires the output of the offset removal unit 201, that is, the angular velocity detection signal of the angular velocity sensor 111 from which the offset component is removed. The angular velocity output unit 222 transmits the angular velocity detection signal to the camera control unit 143 through the communication control unit 211 and the mount contact units 115 and 144. A subject angular velocity acquisition unit 223 acquires the angular velocity data of the subject calculated by the subject angular velocity calculation unit 162 in the camera main body portion 131 through the mount contact units 144 and 115 and the communication control unit 211. A subtractor 224 performs a subtraction by receiving the output of the offset removal unit 201 as a positive input and the output of the subject angular velocity acquisition unit 223 as a negative input. A deviation between the angular velocity of the subject from the subject angular velocity acquisition unit 223 and the angular velocity indicated by the detection signal from which the offset component is removed is calculated. The subtractor 224 outputs the deviation to the integrator 225. The integrator 225 integrates the deviation and outputs a result of an integration calculation to the control determination unit 204.

In the processing of calculating the angular velocity of the subject performed by the subject angular velocity calculation unit 162, processing of detecting the motion amount of the image as a vector and accurately detecting only a vector (a subject vector) corresponding to the subject from all detected vectors is executed. Processing of converting the detected subject vector into the angular velocity (the subject angular velocity) is performed.

Figure 3:
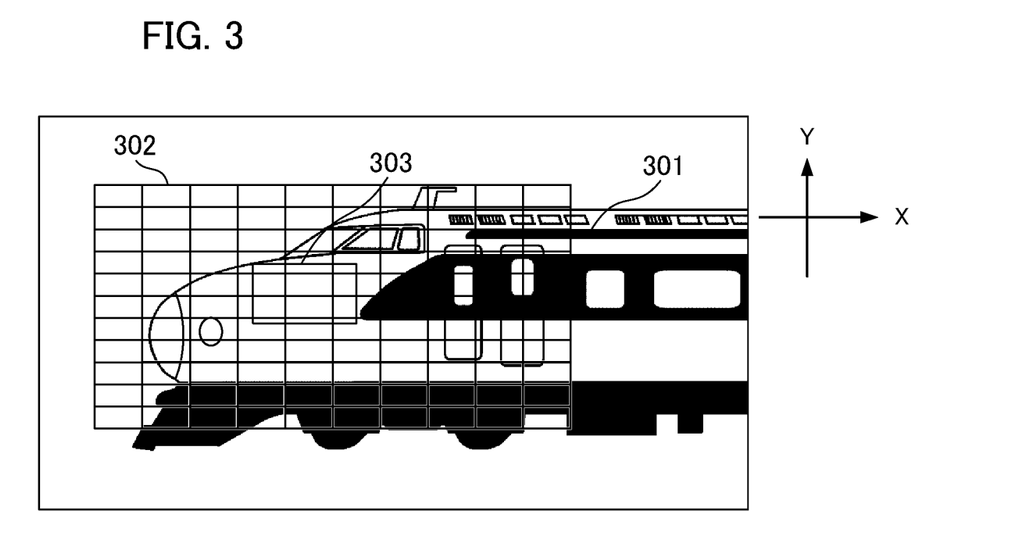
FIG. 3 is a diagram for explaining vector detection at a time of panning imaging.

Here, a method of accurately detecting the subject vector will be described. In the camera main body portion 131, the motion vector detection unit 151 in the camera signal processing circuit 135 detects the motion vector during the panning imaging assist. That is, the motion vector of the image is detected from a plurality of pieces of image information on which signal processing is performed by the analog signal processing circuit 134. A specific example will be described with reference to FIG. 3. FIG. 3 illustrates an example of a photographing scene of a subject 301 that is a moving body. A horizontal direction of a photographing screen is defined as an X direction and a vertical direction of the photographing screen is defined as a Y direction. In this case, two kinds of vector detected by the motion vector detection unit 151 are a vector corresponding to a portion of the subject 301 and a vector corresponding to a background portion. A rectangular frame corresponding to a plurality of detection blocks is a detection frame 302 for detecting the motion vector. A focus frame (a focus detection frame) 303 for focusing on the subject is indicated by the rectangular frame.

In the settings of FIG. 3, there is a dense arrangement in order to correct only subject shake in panning imaging with the correction optical system. That is, by setting a dense type of arrangement, the detection accuracy of each detection block corresponding to the detection frame 302 can be enhanced.

Figure 4:
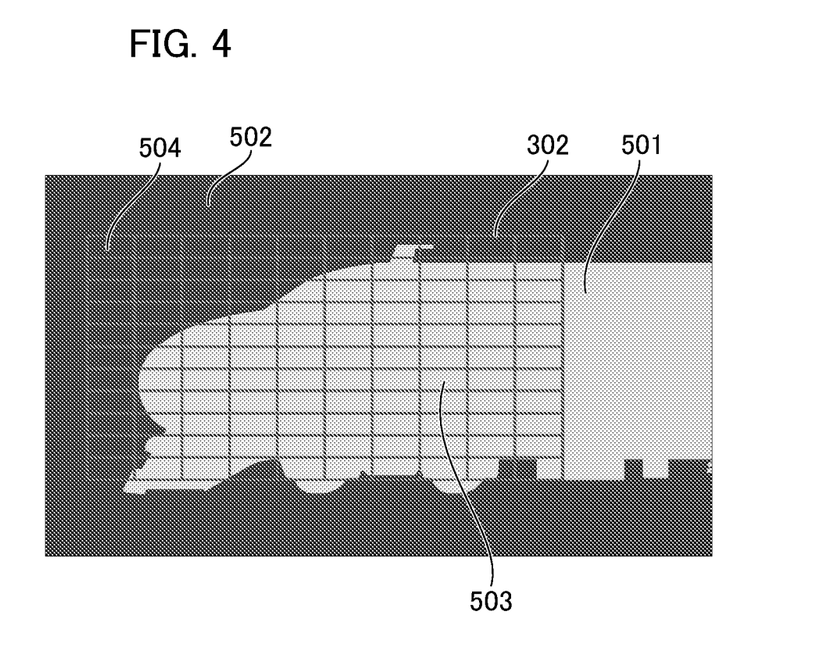
FIG. 4 is a diagram for explaining distance information.

Next, a relationship between the distance information of the image from the distance acquisition unit 181 and the motion vector from the motion vector detection unit 151 will be described using FIG. 4. The distance information (depth information) of the subject in the photographed image is information indicating a distance relationship between the imaging apparatus and the subject in a depth direction. The distance information acquired by the distance acquisition unit 181 is able to be roughly classified into two types and is information of a distance 501 in a closest distance direction and a distance 502 in an infinite direction (a direction toward infinity). FIG. 4 illustrates an example of a distance map corresponding to the image of FIG. 3. The distance 501 in the closest distance direction is a distance from a camera position to the subject on a camera side and is distance information (short distance information) of the subject portion corresponding to the focus frame. The distance 502 is a distance from the camera position to the subject on a background side and is distance information (long distance information) of a background portion that does not correspond to the focus frame.

There are the following methods for acquiring the distance information.

A method of using an autofocus sensor (AF sensor)

The distance acquisition unit 181 acquires the distance information using the AF sensor for phase difference detection. In this case, the imaging apparatus includes an AF dedicated detection unit. A phase difference of an image signal is detected and an image deviation amount, a defocus amount, or the like is able to be acquired as the distance information.

A method of using an evaluation value for the AF of a contrast method

The distance acquisition unit 181 acquires an evaluation value for an autofocus by contrast detection from the image signal by the imaging element 133 and acquires the distance information using the evaluation value.

A method of using an imaging element having an AF function of an image surface phase difference method:

A pair of image signals are able to be obtained by dividing incident light passing through a photographing lens into light of two directions using a pupil division type imaging element having an image surface phase difference detection function. That is, light passing through each of different pupil division regions of the imaging optical system is received by a photoelectric conversion unit of the imaging element. The distance acquisition unit 181 acquires the image deviation amount, the defocus amount, or the like as the distance information from the phase difference of the pair of image signals after the photoelectric conversion.

A method of acquiring a value for setting the distance information by the photographer In a configuration in which the photographer has a setting unit for manually setting the distance to the subject before photographing, the distance acquisition unit 181 acquires the value set by the setting unit as the distance information.

The camera signal processing circuit 135 performs weighting processing on the distance information corresponding to each detection block in the detection frame 302 of FIG. 4 on the basis of the distance information acquired from the distance acquisition unit 181. For example, the weighting processing is performed so that distance information of a detection block 504 corresponding to the background portion is 30 m and distance information of a detection block 503 corresponding to the subject portion is 10 m. It is possible to increase a clustering accuracy of the subject vector and the background vector by using the distance information.

Figure 5A:
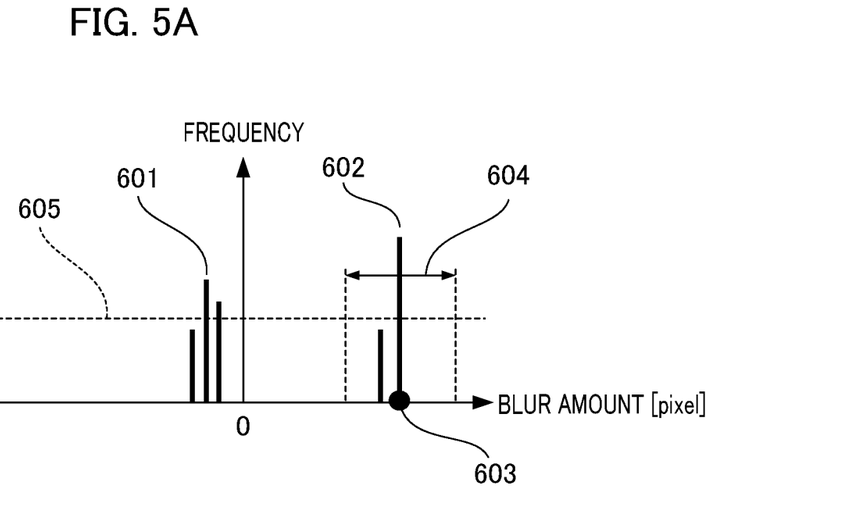
FIGS. 5A and 5B are diagrams for explaining subject vector detection according to the present exemplary embodiment.
Figure 5B:
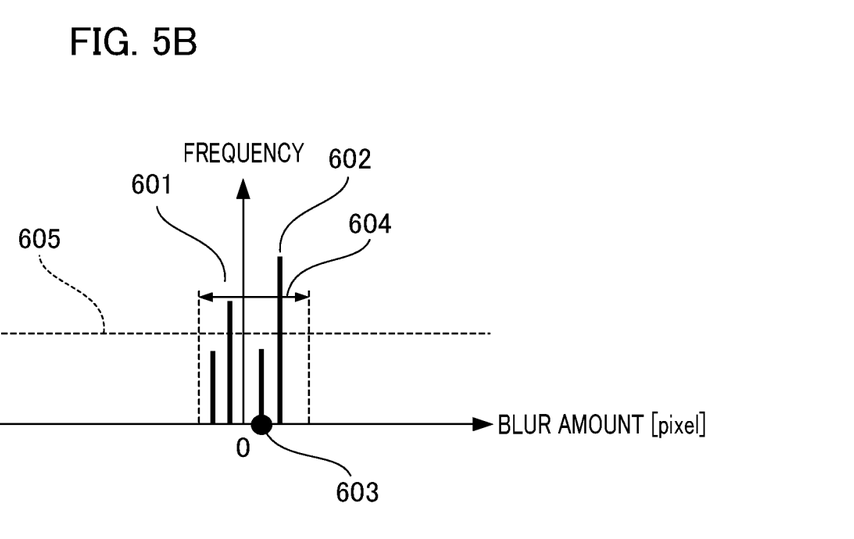

The detection of the subject vector will be described using FIGS. 5A and 5B. FIGS. 5A and 5B illustrate a result of performing a histogram (frequency distribution) calculation on the motion vector detected by the motion vector detection unit 151. A horizontal axis represents a blur amount (unit: pixel) and corresponds to the motion vector. A vertical axis represents a frequency of the motion vector. FIG. 5A shows a histogram of a direction in which the user is shaking the camera at a constant angular velocity or higher. For example, the histogram shown in FIG. 5A is a histogram in the horizontal direction (the X direction) of FIG. 3. In the example of the photographing scene of FIG. 3, the vectors detected by the motion vector detection unit 151 are roughly classified into two kinds of vectors. The two kinds of vectors are a motion vector of an image corresponding to the subject shake (a deviation between the subject and the photographing direction of the camera) and a motion vector of an image corresponding to a background shake.

The motion vector detection unit 151 compares an image of a current frame with an image of a frame one frame prior to the current frame at a set detection block position to detect the motion of the image. However, it is impossible to determine whether the motion of the image is the motion of the subject image or the motion of the background image using only the detection value. Therefore, in the present exemplary embodiment, the subject vector corresponding to the subject and the background vector corresponding to the background are separated from each other from the detection value of the motion vector detection unit 151 using the distance information of the image and the output of the angular velocity sensor. Hereinafter, processing of detecting only the subject vector will be described.

FIG. 5A illustrates a disposition example of a first vector group 601 positioned near zero and a second vector group 602 positioned near a blur amount 603. The blur amount 603 corresponds to the angular velocity information that is the output of the angular velocity sensor 171 converted into the motion amount on the imaging element 133. The second vector group 602 is a vector group present within a constant range 604 centered on the blur amount 603. The constant range 604 is a threshold value range for a background determination. A frequency threshold value 605 is a threshold value for determining whether or not the vector is a valid vector. The camera control unit 143 determines a vector having a frequency that is equal to or greater than the threshold value 605 as a candidate for the background vector in the constant range 604 centered on the blur amount 603. In the example of FIG. 5A, a vector having a frequency that is equal to or greater than the threshold value 605 in the second vector group 602 is determined as the candidate for the background vector. In addition, the camera control unit 143 determines a vector present outside the range 604 and having a frequency that is equal to or greater than the threshold value 605 as a candidate for the subject vector. In the example of FIG. 5A, a vector having a frequency that is equal to or greater than the threshold value 605 in the first vector group 601 is determined as the candidate for the subject vector.

The reason why the threshold value 604 for the background determination is provided in the present exemplary embodiment is to prevent erroneous detection by the motion vector detection unit 151 caused by, for example, variation of the output of the angular velocity sensor 171, variation of the focal distance, or the like. Finally, the camera control unit 143 checks the distance information of the candidate for the subject vector and in the case where the information on the closest distance side has been acquired, the camera control unit 143 selects the detection block 503 (FIG. 4) closest to the focus frame 303 (FIG. 3). In addition, processing of integrating a certain number of subject vectors around a start point of the detection block 503 closest to the focus frame 303 may be performed. In the present exemplary embodiment, an example in which the angular velocity sensor 171 in the camera main body portion 131 is used has been described, but the angular velocity sensor 111 in the interchangeable lens 100 may be used. Alternatively, an exemplary embodiment in which the angular velocity sensors 111 and 171 are used in combination may be used.

On the other hand, FIG. 5B illustrates a histogram in a direction of the shake of the camera by the user with a certain angular velocity or less or in a direction in which the camera has not moved. For example, the histogram shown in FIG. 5B is a histogram in the vertical direction (the Y direction) of FIG. 3. The setting of a horizontal axis and a vertical axis is the same as that of FIG. 5A. Since the angular velocity of the camera shake is very small, FIG. 5B is an example in which all vectors detected by the motion vector detection unit 151 are included in the threshold value range 604 for the background determination. However, in practice, a minute subject shake may occur even though it is not in a panning (or tilting) direction of the camera. In order to extract the minute subject shake, in the case where the distance information of the detection block 503 closest to the focus frame 303 has been acquired, the detection block 503 closest to the focus frame 303 is selected. In addition, processing of integrating a certain number of subject vectors around a start point of the detection block 503 closest to the focus frame 303 may be performed.

After the subject vector is determined, the processing of calculating the subject angular velocity is executed. The angular velocity [degrees/sec] is able to be calculated from the image surface movement amount [pixel] by processing that is the reverse of processing of converting the angular velocity [degrees/sec] into the image surface movement amount [pixel] by using the focal distance, the frame rate, and a pixel pitch of the imaging element. The camera control unit 143 transmits a value obtained by adding the angular velocity data by the angular velocity output unit 222 in the interchangeable lens 100 to the subject angular velocity calculated by the subject angular velocity calculation unit 162 to the lens control unit 112. Transmission information of the camera control unit 143 is received by the lens control unit 112 in the interchangeable lens 100 through the mount contact units 144 and 115.

Next, the second assist function in the panning imaging assist mode will be described. The shutter speed calculation unit 163 in the camera main body portion 131 calculates the shutter speed for the panning imaging assist. Specifically, the shutter speed is calculated by Formula (4), using the following information.

$$TV1=|\alpha/f/(\omega g \pm \omega s)| \quad (4)$$

In the above Formula,
TV1: first exposure time
α: setting value of the flow effect of the background set by the photographer by the operation unit 142
f: focal distance of the interchangeable lens 100 obtained through the mount contact units 115 and 144
ωg: angular velocity detected by the angular velocity sensor 171 in the camera main body portion 131
ωs: subject angular velocity calculated by the subject angular velocity calculation unit 162

The setting value a of the flow effect of the background is a value set in advance at a camera side so that the movement amount on the image surface is a fixed movement amount. Regarding the flow effect of the background, it is possible to set a plurality of effects in stages such as small, medium, and large.

In addition, the exposure time of the case where the shift lens configuring the correction optical system reaches the correction limit is calculated by Formula (5).

$$TV2=|(\theta max-\theta)/(\omega g \pm \omega s)| \quad (5)$$

In the above Formula,
TV2: second exposure time
θmax: maximum correction angle of the correction optical system
θ: current correction angle of the correction optical system
TV2 is an exposure time at which the position of the shift lens is within the maximum correction range.

Figure 6A:
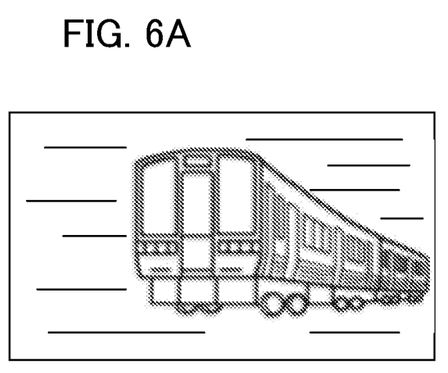
FIGS. 6A to 6D are diagrams for explaining a relationship between a subject shake and a background flow amount.

A specific example in which the first exposure time TV1 calculated by Formula (4) is compared with the second exposure time TV2 calculated by Formula (5) to determine which exposure time is prioritized will be described with reference to FIGS. 6A to 6D. FIG. 6A illustrates an example of an image of the panning imaging at a focal distance of 80 [mm] for a train of a speed of 60 [km/h]. At this time, it is assumed that the camera angular velocity is 20 [degree/sec] and the subject angular velocity is 30 [degree/sec]. The first exposure time TV1 of the case where the flow effect of the background is set to "large", in which the movement amount on the image surface becomes the largest, is about 1/25 [sec]. In the case where the maximum correction angle of the correction optical system is 0.5 [degree] and 0.2 [degree] is used in the shake correction before the exposure, the second exposure time TV2 is about 1/100 [sec]. In the case where the correction optical system is driven using the first exposure time, the correction angle is about 0.4 [degrees], the correction angle of the correction optical system is insufficient, and the subject shake of a remaining correction amount of 0.1 [degrees] occurs.

Figure 6B:
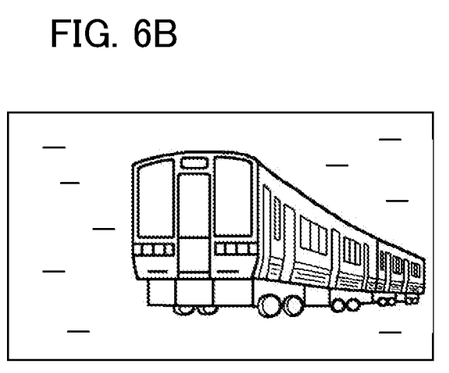

On the other hand, in the case where the second exposure time that is shorter than the first exposure time is used, since the correction angle is able to be kept within the correction limit of the correction optical system, a remaining amount of shake does not occur, but the flow amount of the background is reduced as a difference between the first exposure time and the second exposure time increases. For example, as shown in FIG. 6B, the subject shake does not occur, but since the flow amount of the background is reduced in the case where the imaging is performed in the second exposure time, an image of an unsatisfactory impression is created as an example of the panning imaging.

Figure 6C:
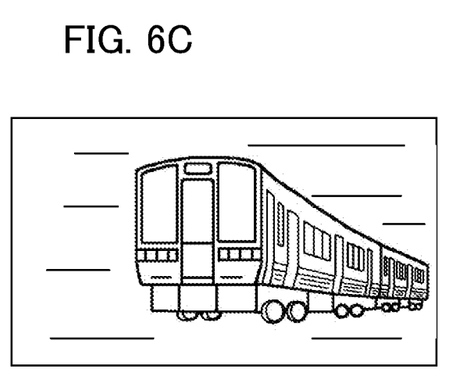

Therefore, in the present embodiment, processing of determining whether the subject shake correction is required to be prioritized or whether the flow amount (the setting value of the flow effect) of the background is required to be prioritized is performed. For example, it is determined which processing is to be performed according to a manual operation from a setting item of the camera or the like by the photographer. Alternatively, only in the case where the correction optical system reaches the correction limit, the imaging apparatus performs an automatic determination. That is, in the case where the first exposure time is shorter than the second exposure time, it is determined to prioritize the first exposure time. In addition, in the case where the first exposure time is longer than the second exposure time, a time difference between the first exposure time and the second exposure time is calculated. In the case where the calculated time difference is less than a predetermined threshold value, it is determined to prioritize the second exposure time. In addition, the threshold value may be an APEX conversion value such as +1.0 steps from the first exposure time or may be an exposure time difference [sec]. Therefore, as shown in FIG. 6C, although the flow amount of the background is somewhat reduced, a photographed image without the subject shake is able to be obtained. On the other hand, in the case where the calculated time difference is equal to or greater than the threshold value, the first exposure time is set and a message is displayed on the screen of the display unit 141. It is possible to inform a photographer whether the shake is delayed or there is too much swinging with respect to the subject image that is the moving body according to the subject angular velocity and the camera angular velocity, using a display and prompt the photographer to improve a photographing method.

As described above, in the second assist function, the shutter speed is automatically set according to the focal distance and the angular velocity when the photographing direction of the camera is changed, by simply setting the flow effect of the background by the photographer. Therefore, even a photographer who is unfamiliar with the panning imaging is able to easily set the shutter speed.

Figure 7:
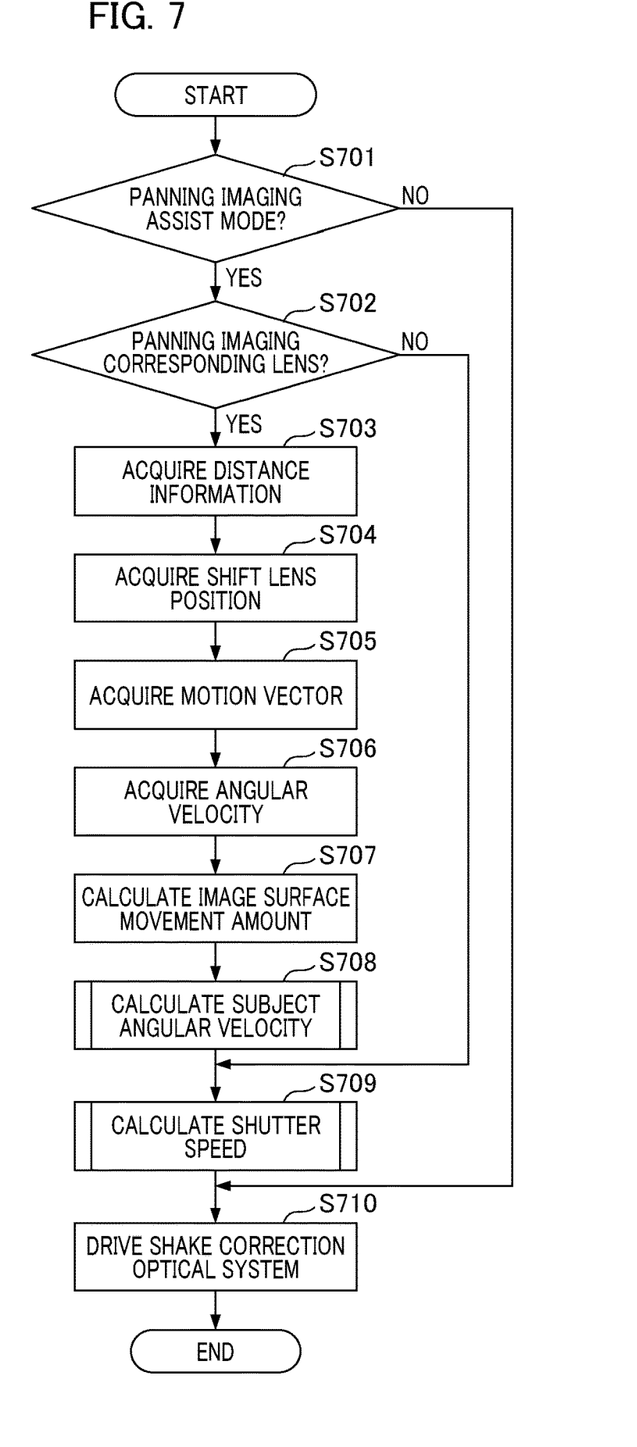
FIG. 7 is a flowchart of panning imaging assist control according to the present exemplary embodiment.
Figure 8:
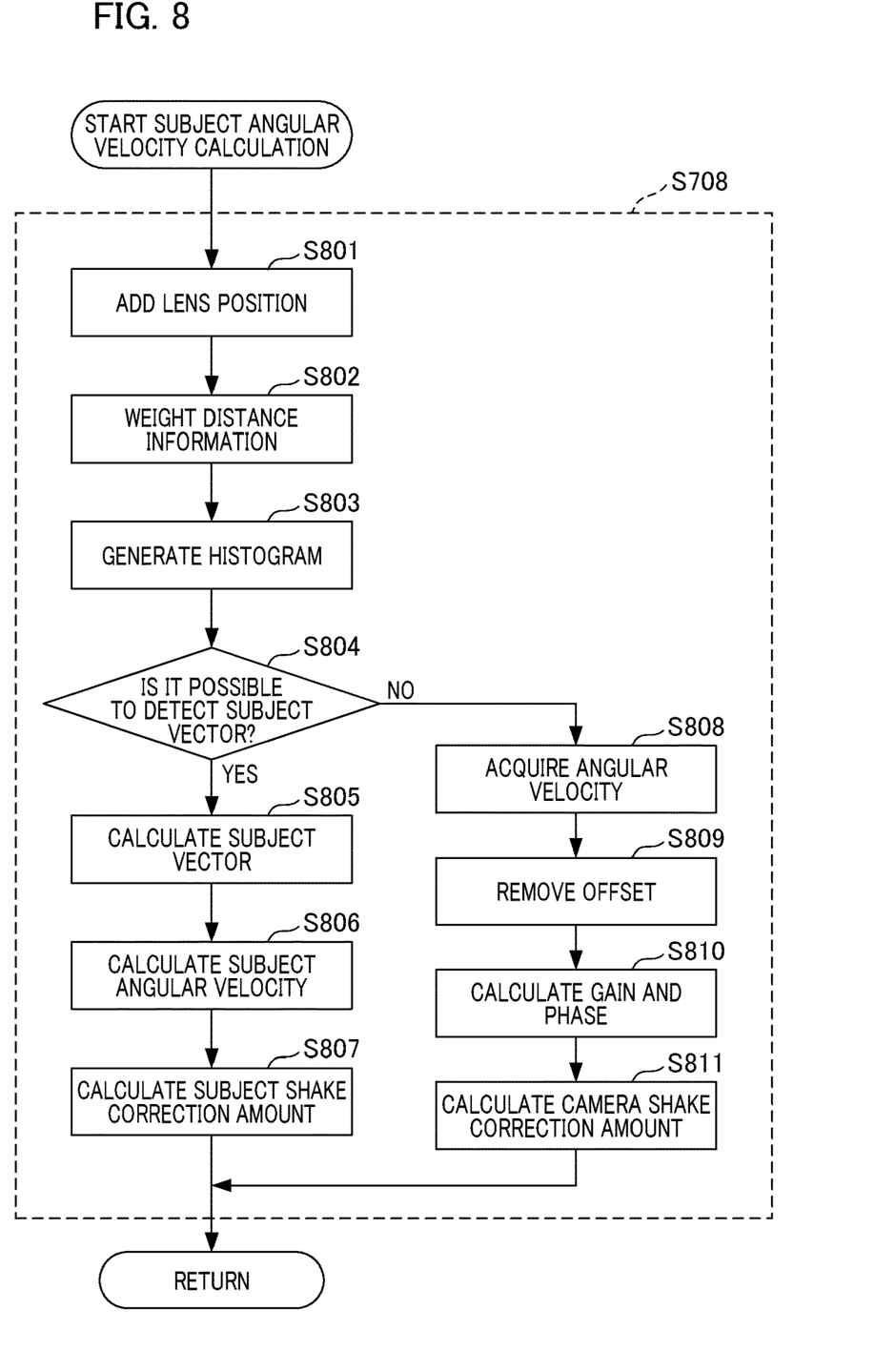
FIG. 8 is a flowchart of a first assist function according to the present exemplary embodiment.
Figure 9:
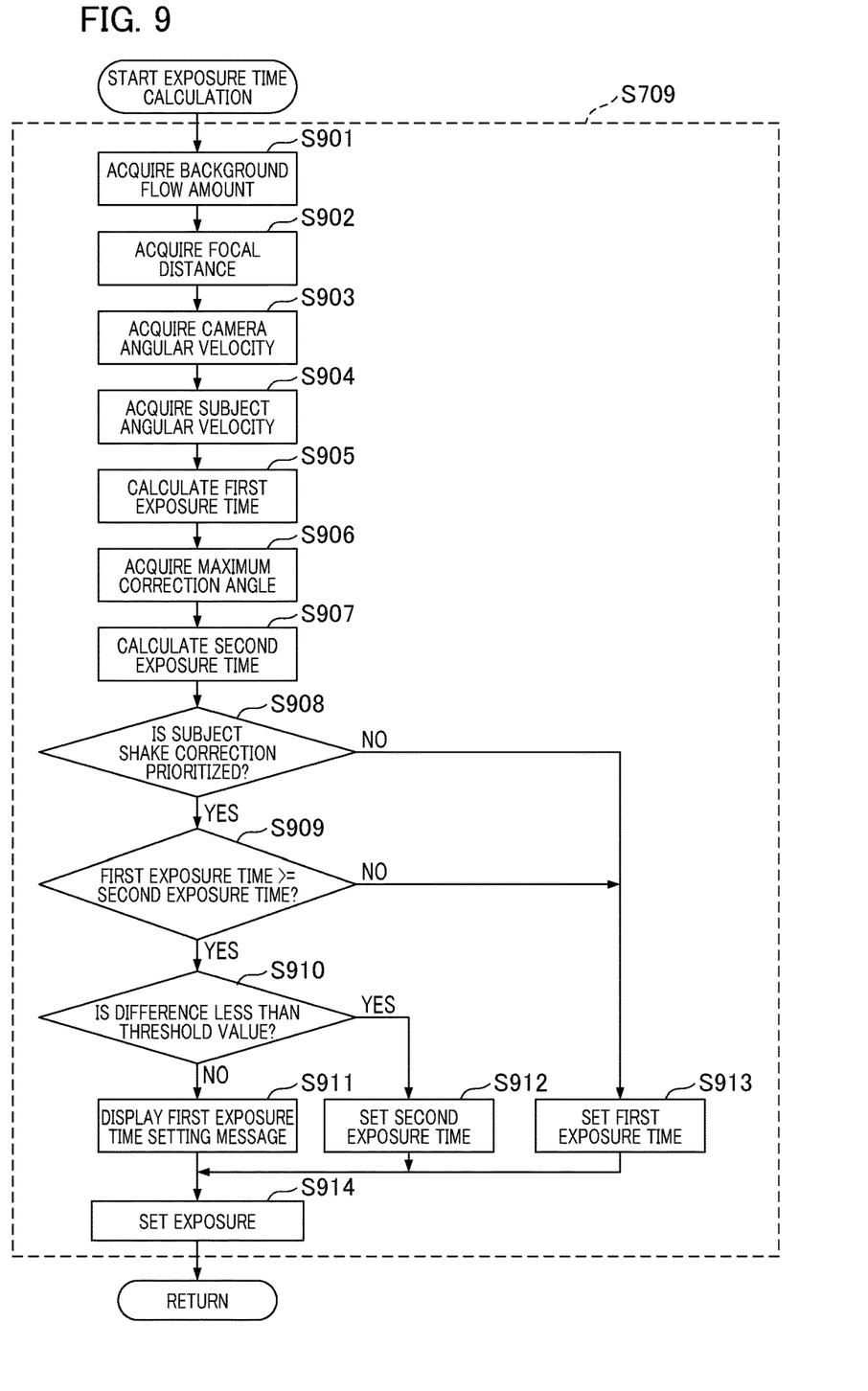
FIG. 9 is a flowchart of a second assist function according to the present exemplary embodiment.

The control of the panning imaging assist will be described with reference to flowcharts of FIGS. 7 to 9. FIG. 7 is a flowchart illustrating a flow of overall processing related to the control of the panning imaging assist. The following processing is realized by interpreting and executing a predetermined control program by each CPU of the camera control unit 143 and the lens control unit 112.

(S701) Processing of Determining the Panning Imaging Assist Mode

The camera control unit 143 determines whether or not the setting operation of the panning imaging assist mode is performed by the photographer by the operation unit 142. In the case where the panning imaging assist mode is set, the processing proceeds to S702, and in the case where a mode other than the panning imaging assist mode is set, the control of the panning imaging assist is not performed and the processing proceeds to S710.

(S702) Processing of Determining the Interchangeable Lens 100

The camera control unit 143 determines whether or not the interchangeable lens 100 attached to the camera main body portion 131 is an interchangeable lens corresponding to the panning imaging assist. In the case where it is determined that the interchangeable lens 100 is the interchangeable lens corresponding to the panning imaging assist, the processing proceeds to S703, and in the case where it is determined that the interchangeable lens 100 is an interchangeable lens that does not correspond to the panning imaging assist, the processing proceeds to S709. In addition, the processing of determining whether or not the interchangeable lens 100 is the interchangeable lens corresponding to the panning imaging assist is performed on the basis of the signal of the lens information transmitted from the lens control unit 112 to the camera control unit 143. In the case where a lens communication function is not provided as in a compact digital camera or the like, the condition determination processing of S702 is unnecessary and the processing proceeds to S703.

(S703) Distance Information Acquisition

The distance acquisition unit 181 acquires the distance information related to the captured image. The motion vector detection unit 151 sets the detection frame 302 of the motion vector. Next, the processing proceeds to S704.

(S704) Position Acquisition of the Shift Lens Group 104

The position information of the shift lens group 104 detected by the position sensor 105 is acquired as information related to a difference between the current correction angle and the maximum correction angle of the correction unit. Here, the acquired position information of the shift lens group 104 is the average value of the output of the position sensor 105 synchronized with a detection period of the motion vector detection unit 151. Next, the processing proceeds to S705.

(S705) Motion Vector Acquisition

The motion vector detection unit 151 detects a motion in the screen as the motion vector. Next, the processing proceeds to S706.

(S706) Angular Velocity Acquisition

The angular velocity detection signal detected by the angular velocity sensor 111 is transmitted from the lens control unit 112 to the camera control unit 143. The camera control unit 143 acquires the angular velocity detection signal of the shake. In addition, the angular velocity detection signal is acquired by the angular velocity sensor 171 in the camera main body portion 131. In addition, the value of the angular velocity detection signal acquired in the present step is the average value of the output of the angular velocity sensor 111 or 171 synchronized with the detection period of the motion vector detection unit 151. Next, the processing proceeds to S707.

(S707) Image Surface Movement Amount Calculation

The camera control unit 143 performs the calculation for converting the angular velocity acquired in S706 into the image surface movement amount. The movement amount (the image surface movement amount) on the image surface is calculated using the angular velocity detected by the angular velocity sensor 111 in the interchangeable lens 100, the focal distance of the imaging optical system, and the frame rate. Next, the processing proceeds to S708.

(S708) Subject Angular Velocity Calculation

The subject angular velocity calculation unit 162 calculates the angular velocity of the main subject from the main subject vector determined using the information acquired in S703 to S706. Details of the processing of the calculation will be described later using FIG. 8. Next, the processing proceeds to S709.

(S709) Shutter Speed Calculation

The shutter speed calculation unit 163 calculates the shutter speed for the panning imaging assist. Details of the processing of the calculation will be described later using FIG. 9. Next, the processing proceeds to S710.

(S710) Driving of the Shake Correction Optical System

The lens control unit 112 receives each piece of data of the subject angular velocity calculated in S708 and the shutter speed for the panning imaging assist calculated in S709 from the camera control unit 143 and determines a control amount for driving the shift lens group 104 during the exposure period. The driver 113 drives the shift lens group 104 according to the determined control amount. Thereafter, the processing of FIG. 7 is ended.

Next, the calculation of the subject angular velocity of S708 of FIG. 7 will be described with reference to the flowchart of FIG. 8.

(S801) the Lens Position Addition

The camera control unit 143 executes the processing of adding the value of the position information of the shift lens group 104 acquired in S704 of FIG. 7 to the detection value of the motion vector detection unit 151. Therefore, even if the shift lens group 104 is driven by the camera shake correction control during the detection of the motion vector, it is possible to obtain an original image of the subject shake. Next, the processing proceeds to S802.

(S802) the Distance Information Weighting

The weighting processing of the distance information corresponding to each detection block detected by the motion vector detection unit 151 is executed based on the distance information (the distance map) in the screen acquired in S703 of FIG. 7. Next, the processing proceeds to S803.

(S803) the Histogram Generation

The camera control unit 143 performs a histogram calculation by the motion vector detected in S705 of FIG. 7. After the histogram is generated, the processing proceeds to S804.

(S804) Determination of a Probability of the Detection of the Subject Vector

The camera control unit 143 determines whether or not the subject vector has been detected based on the detection result of the motion vector detection unit 151. In the case where it is determined that the subject vector has been detected, the processing proceeds to S805. In the case where it is determined that the subject vector has not been detected, the processing proceeds to S808.

(S805) the Subject Vector Calculation

The camera control unit 143 selects the subject vector to be used finally from the subject vector candidates. For example, in the case where the subject vector is detected in the detection block 503 (FIG. 4) closest to the position of the focus frame 303 (FIG. 3) and the distance information thereof has been acquired, the detection block 503 is selected. In addition, the subject vector around the starting point of the detection block 503 may be integrated. After the subject vector is calculated, the processing proceeds to S806.

(S806) the Subject Angular Velocity Calculation

The subject angular velocity calculation unit 162 calculates the angular velocity of the subject. That is, the processing of calculating the subject angular velocity from the image surface movement amount of the subject is performed by the method inverse to the method of calculating the image surface movement amount from the angular velocity in S707 of FIG. 7. Next, the processing proceeds to S807.

(S807) the Subject Shake Correction Amount Calculation

The camera control unit 143 adds the value of the angular velocity transmitted from the angular velocity output unit 222 to the camera control unit 143 to the subject angular velocity calculated in S806 and transmits the value obtained by the addition to the lens control unit 112. The subject angular velocity acquisition unit 223 acquires the subject angular velocity transmitted from the camera control unit 143 to the lens control unit 112 and outputs the subject angular velocity to the subtractor 224. The subtractor 224 calculates the difference between the angular velocity by the angular velocity sensor 111 in the interchangeable lens 100 and the subject angular velocity. The integrator 225 integrates the calculated difference and outputs the integrated value to the control determination unit 204 as the target control value (the subject shake correction amount) of the shake correction control of the subject. Next, the flow shifts to return processing.

(S808) the Angular Velocity Acquisition

The switch to the camera shake correction control is performed from the present step and the camera shake correction control unit 121 performs the control. The angular velocity detected by the angular velocity sensor 111 in the interchangeable lens 100 is acquired, and the processing proceeds to S809.

(S809) the Offset Removal

For example, the processing of cutting off low frequency components included in an angular velocity detection signal and outputting a signal of a high frequency band using a high pass filter having a function of being able to change its characteristics in an arbitrary frequency band may be performed. The offset component superimposed on the angular velocity detection signal is removed. Next, the processing proceeds to S810.

(S810) the Gain and Phase Difference Calculation

The filter circuit configuring by the amplifier and the phase compensation filter having a predetermined gain performs the signal processing by calculating the gain and the phase with respect to the angular velocity detection signal from which the offset component is removed. Next, the processing proceeds to S811.

(S811) the Camera Shake Correction Amount Calculation

The integrator 203 of FIG. 2 integrates the angular velocity on which the signal processing is performed in S810. The angle value obtained by the integration is output to the control determination unit 204 as the target control value (the camera shake correction amount) of the camera shake correction control. Thereafter, the flow shifts to return processing.

The calculation of the shutter speed for the panning imaging assist shown in S709 of FIG. 7 will be described with reference to the flowchart of FIG. 9.

(S901) the Background Flow Amount Acquisition

The camera control unit 143 acquires the setting value ($\alpha$) of the background flow effect on which the photographer performs the setting operation by the operation unit 142. Next, the processing proceeds to S902.

(S902) the Focal Distance Acquisition

The camera control unit 143 acquires the information on the focal distance transmitted from the lens control unit 112 through the mount contact units 115 and 144. Next, the processing proceeds to S903.

(S903) the Camera Angular Velocity Acquisition

The camera control unit 143 acquires the angular velocity ($\omega g$) detected by the angular velocity sensor 171 in the camera main body portion 131. Next, the processing proceeds to S904. In addition, instead of the detection signal of the angular velocity sensor 171, the angular velocity of the angular velocity sensor 111 in the interchangeable lens 100 may be acquired.

(S904) the Subject Angular Velocity Acquisition

The subject angular velocity ($\omega s$) calculated in S708 of FIG. 7 is acquired. Next, the processing proceeds to S905.

(S905) the First Exposure Time Calculation

The shutter speed calculation unit 163 calculates the first exposure time TV1 based on Formula (4) using each piece of data acquired in S901 to S904. In addition, in the case where it is determined that the interchangeable lens that is not corresponding to the panning imaging assist is attached to the camera main body portion 131 in S702 of FIG. 7, the angular velocity detected by the angular velocity sensor 111 is not able to be acquired. In this case, the angular velocity of the background may be calculated from the background vector determined from the histogram of S803 of FIG. 8 and the exposure time may be calculated using this value.

(S906) the Maximum Correction Angle Acquisition

The camera control unit 143 acquires the maximum correction angle of the shift lens transmitted from the lens control unit 112 through the mount contact units 115 and 144 as the information related to the difference between the current correction angle and the maximum correction angle of the correction unit.

(S907) the Second Exposure Time Calculation

The shutter speed calculation unit 163 calculates the second exposure time TV2 on the basis of Formula (5) using the maximum correction angle of the shift lens acquired in S906, the current shift lens position, the camera angular velocity acquired in S903, and the subject angular velocity acquired in S904.

(S908) the Priority Determination of the Subject Shake Correction

The shutter speed calculation unit 163 determines whether or not the subject shake correction is prioritized in a trade-off relationship between the subject shake and the background flow amount of a case where the correction optical system reaches the correction limit. The determination is automatically performed according to an operation instruction performed by the photographer using the operation unit 142 or according to a predetermined program. In a case where it is determined that the subject shake correction is prioritized, the processing proceeds to S909, and in a case where it is determined that the subject shake correction is not prioritized, the processing proceeds to S913.

(S909) the Comparison Determination of the Exposure Time

The shutter speed calculation unit 163 compares the first exposure time TV1 with the second exposure time TV2 and determines whether TV1 is shorter than TV2. In a case where TV1≥TV2 is satisfied, the processing proceeds to S910, and in a case where TV1<TV2 is satisfied, the processing proceeds to S913.

(S910) the Determination of the Threshold Value of the Difference

The difference between the first exposure time TV1 and the second exposure time TV2 is calculated and it is determined whether or not the difference is less than the predetermined threshold value. The reason why the determination is made by setting the threshold value is to prevent reduction of the flow amount of the background and lack of lively feeling as the panning imaging example when the second exposure time is prioritized in a case where the difference is large. In a case where the calculated difference is less than the predetermined threshold value, the processing proceeds to S912, and in a case where the calculated difference is equal to or greater than the predetermined threshold value, the processing proceeds to S911.

(S911) the Setting of the First Exposure Time and the Message Display

In this case, since the difference between the first exposure time TV1 and the second exposure time TV2 is equal to or greater than the threshold value, the shutter speed calculation unit 163 sets the exposure time to TV1. The processing for urging the photographer to improve the photographing method is executed by displaying the message on the screen of the display unit 141. Next, the processing proceeds to S914.

(S912) the Setting of the Second Exposure Time

In this case, since the difference between the first exposure time TV1 and the second exposure time TV2 is less than the threshold value, the shutter speed calculation unit 163 sets the exposure time to TV2. Therefore, in a case where the subject shake as shown in FIG. 6A is able to occur, an image as shown in FIG. 6C without the subject shake is imaged instead of somewhat reduction of the flow amount of the background. Next, the processing proceeds to S914.

(S913) the Setting of the First Exposure Time

Figure 6D:
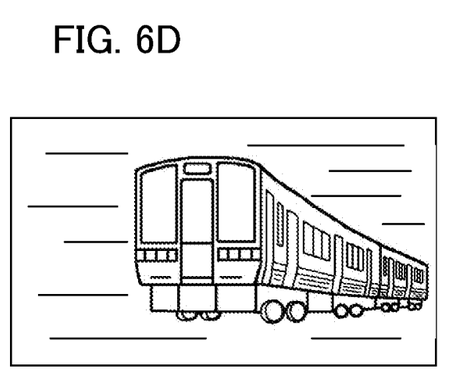

In a case where the subject shake correction is not prioritized in S908 or in a case where TV1 is shorter than TV2 in S909, the shutter speed calculation unit 163 sets TV1. In this case, there is no subject shake, the flow amount of the background is also set as the flow effect, and an image as shown in FIG. 6D is imaged. Next, the processing proceeds to S914.

(S914) the Exposure Setting

The camera control unit 143 performs the exposure setting according to the setting of the exposure time in S911 to S913 based on the condition determination in S908 to S910.

In the present exemplary embodiment, with the first and second assist functions, it is possible to easily image a beautiful panning imaging photograph of which a background image flows and of which the image blur of the subject is reduced. According to the present exemplary embodiment, it is possible to set a suitable exposure time in the subject shake correction while taking into account the relationships between the subject shake, the hand shake, and the exposure time.

Although the preferred exemplary embodiment of the present invention has been described using the imaging apparatus shown in FIG. 1, that is, a so-called mirror-less camera, the present invention is able to be widely applied to a single lens reflex camera, a compact digital camera, or the like. In addition, in the present exemplary embodiment, although the example of the panning imaging assist has been described, of course, the present invention is able to be applied to a case other than the panning imaging assist. For example, in the panning imaging assist, the first exposure time based on the background flow effect is calculated, but the exposure time obtained from the line diagram of the program of the photographing mode (a panorama mode or the like) may be set as the first exposure time.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-204682, filed Oct. 23, 2017 which is hereby incorporated by reference herein in its entirety.

What is claimed is:

1. An imaging apparatus for optically correcting an image blur by a correction unit for an image of a subject that is imaged by an imaging unit through an imaging optical system, the imaging apparatus comprising:
   at least one processor and at least one memory functioning as:
   (1) an acquisition unit configured to acquire information related to a difference between a current correction angle and a maximum correction angle of the correction unit;
   (2) a first calculation unit configured to calculate a first exposure time related to the imaging unit;
   (3) a second calculation unit configured to calculate a second exposure time related to the imaging unit based on a shake detection signal detected by a first detection unit, a motion amount of a subject image detected by a second detection unit, and the information related to the difference between the current correction angle and the maximum correction angle of the correction unit; and
   (4) a determination unit configured to determine an exposure time when imaging is performed by the imaging unit,
   wherein, in a case where a flow effect of an image has priority over an image blur correction, the determination unit determines the exposure time when imaging as the first exposure time, and
   wherein, in a case where the first exposure time exceeds the second exposure time, the determination unit determines the exposure time when imaging as the second exposure time.

2. The imaging apparatus according to claim 1, wherein the at least one processor and at least one memory further function as:
   a setting unit configured to set a mode for supporting panning imaging, and
   wherein, in the case where the mode is set, the determination unit determine the exposure time when imaging as the first or second exposure time.

3. The imaging apparatus according to claim 2, wherein the first calculation unit calculates the first exposure time using the shake detection signal, the motion amount of the subject image, a focal distance of the imaging optical system, and a set value of a flow effect of a background image.

4. The imaging apparatus according to claim 1, wherein the first calculation unit calculates the first exposure time by a program diagram of a photographing mode.

5. The imaging apparatus according to claim 3, wherein, in the case where the image blur correction has priority over the flow effect of the background image, the determination unit determines the exposure time as the second exposure time when the first exposure time exceeds the second exposure time and a difference between the first exposure time and the second exposure time is less than a threshold value and determines the exposure time when imaging as the first exposure time when the first exposure time exceeds the second exposure time and the difference is equal to or greater than the threshold value.

6. The imaging apparatus according to claim 1, wherein the determination unit determines which of the image blur correction and the flow effect of the background image is prioritized according to an instruction from an operation unit.

7. The imaging apparatus according to claim 1, wherein, in the case where the first exposure time is shorter than the second exposure time that is the case where the correction unit reaches a correction limit, the determination unit determines the exposure time when imaging as the first exposure time.

8. The imaging apparatus according to claim 1, wherein the at least one processor and at least one memory further function as:
  a first control unit configured to control the correction unit by a correction amount calculated from the shake detection signal; and
  a second control unit configured to calculate angular velocity data of the subject with respect to the imaging apparatus, calculate a correction amount of the image blur of the subject, and control the correction unit.

9. The imaging apparatus according to claim 1, wherein the correction unit includes a correction lens for correcting the image blur by changing an image forming position of light from the subject.

10. A control method executed in an imaging apparatus for optically correcting an image blur by a correction unit for an image of a subject that is imaged by an imaging unit through an imaging optical system, the control method comprising:
  acquiring information related to a difference between a current correction angle and a maximum correction angle of the correction unit;
  calculating a first exposure time related to the imaging unit;
  calculating a second exposure time related to the imaging unit based on a shake detection signal detected by a first detection unit, a motion amount of a subject image detected by a second detection unit, and the information related to the difference between the current correction angle and the maximum correction angle of the correction unit; and
  determining an exposure time when imaging is performed by the imaging unit,
  wherein, in determining the exposure time, in a case where a flow effect of an image has priority over an image blur correction, the exposure time when imaging is determined as the first exposure time, and
  wherein, in determining the exposure time, in a case where the first exposure time exceeds the second exposure time, the exposure time when imaging is determined as the second exposure time.

* * * * *